May 9, 1950
J. P. JOHNSON
2,506,835
PORTABLE POWER-DRIVEN SCREW SETTER
WITH SCREW FEEDING MEANS
Filed March 29, 1946
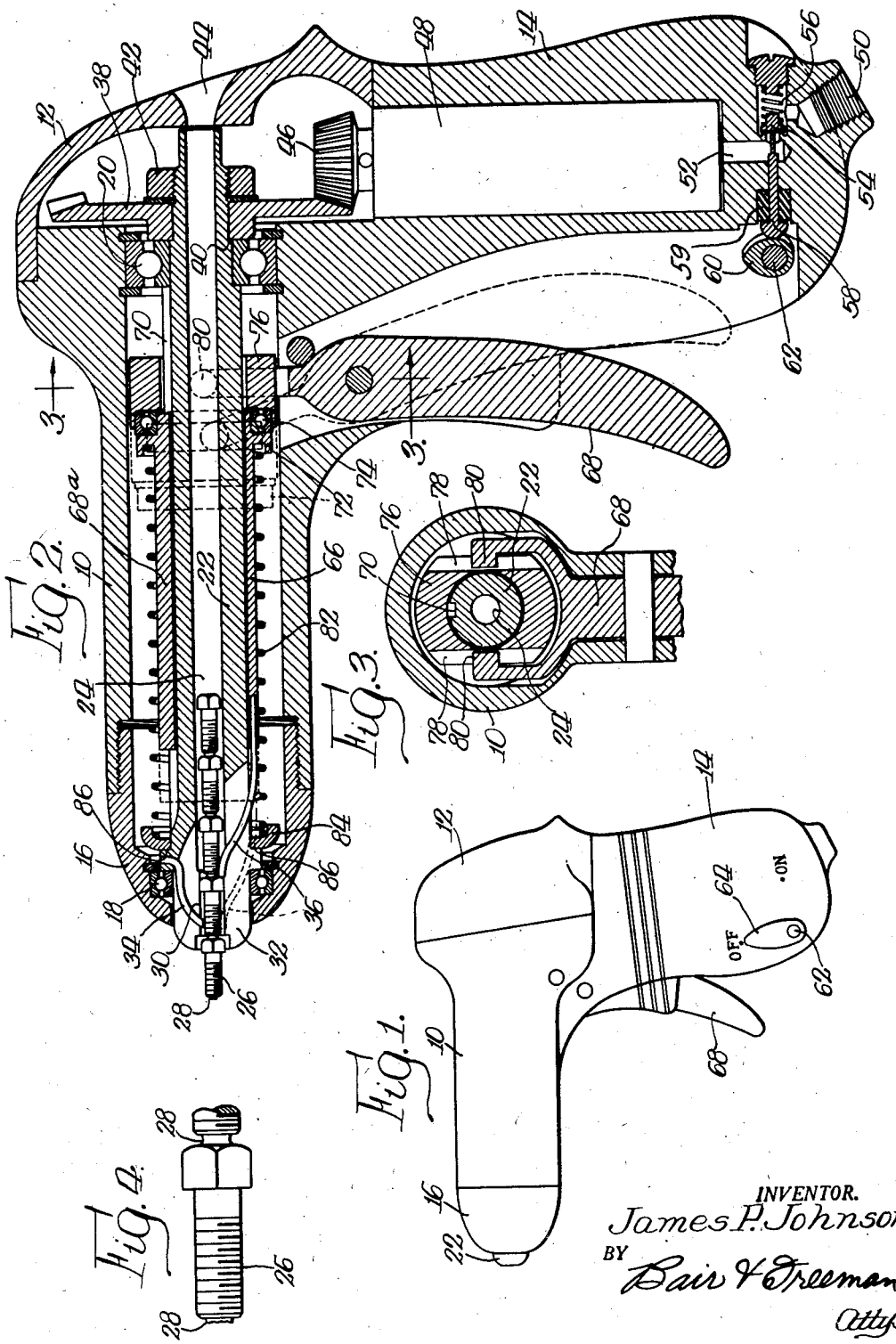
INVENTOR.
James P. Johnson,
BY Bair & Freeman
Attys.

Patented May 9, 1950

2,506,835

UNITED STATES PATENT OFFICE 2,506,835

PORTABLE POWER-DRIVEN SCREW SETTER WITH SCREW FEEDING MEANS

James P. Johnson, Cleveland, Ohio, assignor to The Aro Equipment Corporation, Bryan, Ohio, a corporation of Ohio Application March 29, 1946, Serial No. 658,302

3 Claims. (Cl. 144—32)

1

My present invention relates to a setter for screws of the "screw stick type."

One object of the invention is to provide a screw setter which is comparatively simple to manufacture and is operated by a small pneumatic motor.

Another object is to arrange the pneumatic motor in such relation to a screw driving sleeve that a screw stick can be fed into the rear end of the sleeve without the motor interfering with this operation in any manner.

Another object is to provide a screw setter which has preferably a pistol type hand grip projecting sidewise at an angle from the barrel of the screw setter along the axis of which the screw driving sleeve is located.

A further object is to provide a bevel gear connection between the screw driving sleeve and the pneumatic motor whereby the speed of the sleeve is slowed down somewhat relative to a motor of comparatively high speed to give sufficient power for rotating the screw stick until a screw breaks off at a predetermined torque during operation of the screw setter.

Still a further object is to provide means located within the barrel of the screw setter for ratcheting the screw stick forwardly one screw at a time in response to a trigger located in the hand grip of the tool, the motor and screw driving sleeve being operated continuously for successive screw setting operations under control of a valve lever on the hand grip which may be set at either valve opened or valve closed position.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a side elevation on a reduced scale showing a screw setter embodying my invention;

Figure 2 is an enlarged longitudinal vertical sectional view through the screw setter;

Figure 3 is a sectional view on the line 3—3 of the Figure 2; and

Figure 4 is a further enlarged view of a portion of a screw stick used in my screw setter.

On the accompanying drawings, I have used the reference numeral 10 to indicate a screw setter barrel which barrel has an enlarged gear housing 12 at the rear end and a laterally extending hand grip portion 14. Screwed to the front end of the barrel is a nose piece 16 in which is located a bearing 18.

2

A bearing 20 is located within the barrel 10 adjacent the rear end thereof. The two bearings 18 and 20 rotatably support a screw setting sleeve 22.

The sleeve 22 has a bore 24 adapted to receive a screw stick 26. These sticks are merely a series of screws formed of one rod with under-cut portions 28 between the successive screws, the undercut portions being adapted to break off upon predetermined torque being imparted to a second screw following a first one that is being screwed into position. Thus each screw is set with a predetermined torque that automatically results due to such break-off.

The bore 24 of the sleeve 22 is provided with a reduced portion 30 at its forward end adapted to rotate the second screw. The forward end of the screw driving sleeve has a slot indicated at 32 in Figure 2 to permit operation of a holding spring 34 and an actuating spring 36 adapted to feed the screw stick forwardly one screw length at a time.

For rotating the screw through the sleeve 22, I provide a bevel gear 38 positioned against a shoulder 40 of the sleeve by a jam nut 42. Adjacent the jam nut, the gear cover 12 is provided with an opening 44 through which the screw stick may be fed into the sleeve 22.

A bevel pinion 46 meshes with the bevel gear 28, the bevel pinion being on a shaft of a pneumatic motor 48. The motor 48 may be of the turbine or vane type and fed with compressed air or other suitable actuating fluid from an inlet 50.

For controlling the flow of compressed air from the inlet 50 to a passageway 52 leading to the motor 48, I provide a valve plug 54 normally seated by a spring 56 and adapted to be unseated by a sliding pin 58 with which a cam 60 is adapted to coact. The cam 60 is secured to a shaft 62 which shaft on the outside of the tool has a lever 64 secured thereto for rotating the shaft. A resilient packing 59 under the head of the pin 58 serves also to constrain the pin toward its outer limit of movement.

For moving the actuating spring 36 forwardly as to the dotted position shown in Figure 2, I provide a sleeve 66 and a trigger 68. The sleeve 66 is slidably and nonrotatably mounted on the sleeve 22, the sleeve 66 having a projecting fin 68a located in a key way 70 of the sleeve 22 for this purpose. The sleeve 66 has a surrounding flange 72 adjacent its rear end against which is positioned a bearing 74 and a collar 76.

The collar 76 has vertical slots 78 (see Figure 3) in which trunnions 80 of a forked upper end of the trigger 68 are slidably mounted. Accordingly, by moving the trigger 68 from the full line to the dotted line position of Figure 2, the collar 76 and thereby the actuating spring 36 may be moved forwardly. The parts are then returned after release of the trigger by a return spring 82 surrounding the sleeve 66 and interposed between the flange 72 and a cupped washer at 84. The cupped washer 84 is positioned against a shoulder 86 of the sleeve 22.

In the operation of my screw setter, a screw stick is inserted through the opening 44 into the bore 24 of the sleeve 22 until the first screw projects as shown in Figure 2 and the second screw has its head located in the reduced bore portion 30 so that rotation of the screw setting sleeve 22 will rotate the screw stick. These screw sticks come in about six inch lengths which is approximately the total length of the sleeve 22 plus the length of the opening 44.

The valve lever 64 may now be turned to the "on" position for rotating the screw stick and the first screw can be engaged with the threaded opening and the screw will be driven home until the torque on the sleeve 22 exceeds the resistance to torque offered by the reduced portion 28 of the stick between the first and second screws. This portion will then break off as shown at the left hand end of Figure 4 and the trigger 68 may then be depressed for moving the second screw up to the former position of the first screw. The second screw may then be similarly set and the trigger again operated for bringing the third screw to a setting position and so on until the screw stick is used up.

From the foregoing disclosure, it will be obvious that I have provided a tool that can be quickly operated for setting a number of screws in a minimum of time. The screws can be fed forwardly as desired by the trigger 68 and each quickly set by engaging it with a threaded opening adapted to receive it. When the screw stick is used up, the motor 48 can be turned "off" and another screw stick readily inserted.

The screw setting operations are performed quickly by reason of the motor 48 rotating at relatively high speed and when a new screw stick is to be inserted the motor does not interfere with its insertion in any way as the motor is mounted off to the side of the axis along which the screw is received. The arrangement is particularly adapted for mounting of the motor in a pistol grip type of hand grip without being of prohibitive size for installation in this manner.

Some changes may be made in the construction and arrangement of parts of my device without departing from the real spirit of my invention and it is my intention to cover by my claims any modified forms of structure or use of mechanical equivalents which may be reasonably included within their scope.

I claim as my invention:

1. In a pneumatic screw setter, a barrel, a pistol grip extending laterally from said barrel, a screw driving sleeve journaled in said barrel and having its rear end open to the exterior of the tool for insertion of a screw stick, a pneumatic motor for rotating said screw driving sleeve, said motor being located in said pistol grip, means for propelling the screw stick forwardly one screw at a time, comprising a second sleeve slidable on said first sleeve, means on said second sleeve to engage the screw stick whereby sliding movement of the second sleeve can effect movement of the screw stick, a pivoted trigger having means engageable with said second sleeve whereby it is operable to effect movement of said second sleeve and thereby the screw stick, and a valve for controlling the flow of actuating fluid to said motor.

2. In a pneumatic screw setter, a barrel, a hand grip extending from said barrel a screw driving sleeve rotatable in said barrel and having its rear end open to the exterior of the tool for insertion of a screw stick, bearings in said barrel for supporting the ends of said driving sleeve, a motor for rotating said screw driving sleeve, said motor being located in said hand grip, means for propelling the screw stick forwardly one screw at a time comprising a screw feeding sleeve slidable on said driving sleeve between said bearings, a screw engaging spring carried by said feeding sleeve and passing through a slot in said driving sleeve to engage the screw stick therein, and a pivoted trigger having means engageable with said feeding sleeve to effect sliding movement thereof and thereby the screw stick along the bore of said driving sleeve.

3. In a pneumatic screw setter, a barrel, a screw driving sleeve rotatably mounted therein, a pistol grip on said barrel, a pneumatic motor located in said pistol grip, a bevel geared connection between said screw driving sleeve and said motor, said sleeve being adapted to receive a screw stick and having an other-than-round bore portion to coact with a head of a screw in the screw stick to effect rotation thereof when the sleeve rotates, a holding spring for said screw stick, said holding spring being connected with said barrel, an actuating spring to effect sliding of the screw stick through said sleeve and said bore portion, means for actuating said actuating spring comprising an actuating sleeve surrounding said screw driving sleeve and normally biased in a rearward direction, said actuating spring being connected with said actuating sleeve, and a trigger for moving said last sleeve in a forward direction, said trigger being pivoted in said hand grip and having a forked upper end coacting with a shoulder portion of said actuating sleeve.

JAMES P. JOHNSON.

REFERENCES CITED

The following references are of record in the file of this patent:

UNITED STATES PATENTS

| Number | Name | Date |
|---|---|---|
| 1,362,697 | Herman | Dec. 21, 1920 |
| 1,369,894 | Jones | Mar. 1, 1921 |
| 2,256,012 | Blair | Sept. 16, 1941 |
| 2,261,230 | Cox et al. | Nov. 4, 1941 |
| 2,327,795 | Hutchison, Jr. | Aug. 24, 1943 |